United States Patent [19]

Boocock et al.

[11] Patent Number: 4,732,571

[45] Date of Patent: Mar. 22, 1988

[54] PROCESS FOR DYEING OF POLYMERS OF ETHYLENE WITH BASIC DYES

[75] Inventors: John R. B. Boocock; Vaclav G. Zboril, both of Kingston, Canada

[73] Assignee: Du Pont Canada Inc., Mississauga, Canada

[21] Appl. No.: 947,850

[22] Filed: Dec. 30, 1986

Related U.S. Application Data

[63] Continuation-in-part of Ser. No. 756,177, Jul. 18, 1985, abandoned.

[30] Foreign Application Priority Data

Jun. 27, 1985 [CA] Canada .................................. 485660

[51] Int. Cl.$^4$ ...................... C08L 23/02; C08L 51/06; D06P 1/41; D06P 3/79
[52] U.S. Cl. ........................................... 8/513; 8/654; 8/657; 8/928
[58] Field of Search ........................... 8/513, 654, 657

[56] References Cited

U.S. PATENT DOCUMENTS 3,765,829  10/1973  Lambert et al. ...................... 8/513
4,320,046   3/1982  Havens ................................. 524/83

*Primary Examiner*—A. Lionel Clingman

[57] ABSTRACT

A process for the dyeing of polymers of ethylene is disclosed. The process involves contacting articles of the polymer with an aqueous dyebath containing a basic dye in a concentration of at least 0.5 g/l and at a pH of at least 5.0. The temperature of the aqueous dyebath is at least 35° C., especially at least 55° C. The article is maintained in contact with the dyebath for at least 20 seconds. The polymer of ethylene is a blend of 65–99 parts of a homopolymer of ethylene or copolymer of ethylene and at least one $C_3$–$C_{10}$ higher alpha-olefin with 1–35 parts of a direct or graft copolymer of an alpha-olefin having carboxylic acid, carboxylic acid anhydride, ionomeric or —OH groups. Dyed polymers of ethylene are obtained.

14 Claims, No Drawings

PROCESS FOR DYEING OF POLYMERS OF ETHYLENE WITH BASIC DYES

This application is a continuation-in-part of Application Ser. No. 756,177, filed July 18, 1985, now abandoned.

BACKGROUND OF THE INVENTION

1. Field of the Invention

The present invention relates to a process for the dyeing of polymers of ethylene and especially to the dyeing of blends of polyethylene with polymers containing carboxylic acid and certain other polar groups.

2. Description of the Prior Art

Polymers of alpha-olefins in which the alpha-olefin is a hydrocarbon are well known. Such polymers, which include homopolymers of ethylene and copolymers of ethylene with $C_3$–$C_{10}$ alpha-olefins, are used in large volumes for a variety of end-uses e.g. in the form of fibres, films, moulded articles and the like. If fabricated articles are desired in a colour other than the natural colour of the polymer, it is often possible to pigment the polymer or, especially if the surface of the polymer has been suitably treated, to print the fabricated article. The use of pigments and/or printing techniques depends to some extent on the nature of the fabricated article and the process used in the manufacture of the article.

In some instances, it is desirable or even necessary to be able to dye the fabricated article. In general, hydrocarbon polyolefins are not receptive to dyes, although techniques to render polyolefins receptive to dyes are known, including copolymerization of polar monomers into the polymer. However, polar monomers tend to act as catalyst poisons in ethylene polymerization processes, especially so-called solution polymerization processes, and hence cause process problems or cannot be tolerated in the polymerization process. For some end-uses, the techniques used to render polyolefins receptive to dyes may not be economically attractive and/or may affect deleteriously the properties of the polymer.

The blending of polar polymers with hydrocarbon polyolefins is known. For instance, blends of polyethylene with ethylene/methacrylic acid copolymers that yield films with a high degree of toughness and a high yield strength are disclosed in U.S. Pat. No. 3,709,957 of D. L. Brebner, which issued Jan. 9, 1973. Blends of polyethylene and ionomer polymers intended for the manufacture of film having excellent linear tear properties are disclosed in U.S. Pat. No. 4,098,406 of N. J. Otten et al., which issued July 4, 1978. Ionomer polymers are disclosed in U.S. Pat. No. 3,264,272 of R. W. Rees, which issued Aug. 2, 1966. The dyeing of ethylene polymers blended with copolymers of $C_{14}$ or higher alpha-olefins and maleic anhydride is described in U.S. Pat. No. 4,320,046 of R. H. Havens, which issued Mar. 16, 1982.

The dyeing of acrylic polymers with basic dyes is known and is, for instance, described in a manual from Sandoz Ltd. of Basle, Switzerland, entitled "Sandocryl ® B Dyestuffs and Chemicals for the Dyeing and Finishing of Acrylic Fibres". Normally, dyeing is carried out at pH 4.5.

SUMMARY OF THE INVENTION

A process for the dyeing of blends of polyethylene with polymers having carboxyic acid and certain other polar groups has now been found.

Accordingly, the present invention provides a process for dyeing a polyolefin article, comprising the steps of:

(A) contacting the polyolefin article with an aqueous dyebath, said polyolefin being a blend comprising (i) 65–99 parts by weight of a polyethylene selected from the group consisting of homopolymers of ethylene and copolymers of ethylene with $C_3$–$C_{10}$ higher alpha-olefins, and mixtures thereof, and (ii) 1–35 parts by weight of a copolymer selected from the group consisting of direct copolymers and graft copolymers wherein (a) said direct copolymer is the copolymer of an alpha-olefin having the formula R—CH=$CH_2$, where R is a radical selected from the class consisting of hydrogen and alkyl radicals having from 1 to 8 carbon atoms with at least one alpha,beta-ethylenically unsaturated carboxylic acid or monoalkyl ester of alpha,beta-ethylenically unsaturated dicarboxylic acid having from 3 to 8 carbon atoms, the acid moieties being randomly or non-randomly distributed in the polymer chain, the carboxylic acid content being 0.5–50% by weight of the direct copolymer, any other copolymerized monomer being monoethylenically unsaturated, (b) said direct polymer is a saponified copolymer of ethylene and vinyl ester of a carboxylic acid, (c) said graft copolymer is obtained by grafting 0.1 to 20 percent by weight of at least one alpha,beta-unsaturated carboxylic acid having 3 to 8 carbon atoms or unsaturated carboxylic acid anhydride onto a preformed polyolefin backbone derived from ethylene or ethylene and $C_3$ to $C_8$ alpha-olefin, in which polyolefin backbone any other optionally copolymerized monomer component is monoethylenically unsaturated, and (d) said copolymer is a copolymer of (a) or (c) in the form of an ionomer, said aqueous dyebath containing basic dye in a concentration of at least 0.4 g/l and at a pH of at least 5.0, the temperature of the aqueous dyebath being at least 35° C.;

(B) maintaining said polyolefin article in contact with the aqueous dyebath for a period of at least 20 seconds; and (C) removing the polyolefin article so dyed from the aqueous dyebath.

In a preferred embodiment of the present invention, the blend also contains 0.2–2% by weight of a white pigment, especially titanium dioxide.

DETAILED DESCRIPTION OF THE INVENTION

The polyethylene of the blend may be a homopolymer of ethylene and/or a copolymer of ethylene with at least one hydrocarbon alpha-olefin having 3–10, especially 4–10, carbon atoms, e.g. a copolymer of ethylene with a minor amount of propylene, butene-1, hexene-1 and/or octene-1.

The characteristics of the polyethylene will depend to a large extent on the intended end-use of the resultant products. For instance the density may range from about 0.890 g/cm$^3$ to about 0.970 g/cm$^3$ and the melt index, as measured by the method of ASTM D-1238 (Condition E), may range up to about 200 dg/min. For example, polymers intended for film and sheet end-uses tend to have melt indices of less than about 10 dg/min. whereas polymers intended for moulding end-uses tend to have higher values of melt index. The ranges of density and melt index, and of related parameters, of polyethylenes that are useful for various types of products are known to those skilled in the art.

The blend also contains a copolymer which may be a direct copolymer or a graft copolymer. The direct copolymer may be a copolymer of an alpha-olefin having the formula R—CH=CH$_2$, where R is a radical selected from the group consisting of hydrogen and alkyl radicals having from 1 to 8 carbon atoms, with at least one alpha,beta-ethylenically unsaturated carboxylic acid or monoalkyl ester of alpha,beta-ethylenically unsaturated dicarboxylic acids having from 3 to 8 carbon atoms. The acid moieties may be randomly or non-randomly distributed in the polymer chain. The carboxylic acid content of the copolymer is 0.5–50% by weight of the copolymer. Such direct copolymers are known and include copolymers of ethylene with acrylic acid, methacrylic acid, monomethyl ester of maleic acid and the like. For example, Nucrel ® acid copolymers are available from E. I. du Pont de Nemours and Company of Wilmington, Del., U.S.A.

The direct copolymers may be saponified polymers of ethylene and vinyl esters of carboxylic acids, which are known. Examples of such polymers are the polymers available from Nippon Gohsei, Osaka, Japan under the trade mark Soarnol.

Alternatively, the copolymer may be a graft copolymer obtained by grafting 0.1 to 20 percent by weight of at least one alpha,beta-unsaturated carboxylic acid having 3 to 8 carbon atoms or unsaturated carboxylic acid anhydride onto a preformed polyolefin backbone derived from ethylene or ethylene and C$_3$ to C$_8$ alpha-olefin. Any other optionally copolymerized monomer component of the polyolefin backbone is monoethylenically unsaturated. For example, the graft copolymer may be a homopolymer of ethylene or a copolymer of ethylene with a C$_3$–C$_{10}$ hydrocarbon alpha-olefin that has been grafted with e.g. acrylic acid, methacrylic acid, maleic acid, fumaric acid, itaconic acid, crotonic acid and maleic anhydride. Techniques for the preparation of grafted copolymers are known in the art, preferred examples of which are disclosed in the copending application Ser. No. 756,224 of G. White filed concurrently with Ser. No. 756,177, and in U.S. Pat. No. 4,612,155 of C. S. Wong and R. A. Zelonka which issued Sept. 16, 1986. Grafted copolymers are also available from Mitsui Petrochemical Industries in blended form under the trade mark Admer.

The direct copolymers may also be in the form of ionomers formed from the acid copolymers referred to above. Such ionomers are also known and are, for instance, available under the trade mark Surlyn from E. I. du Pont de Nemours and Company and described in detail in the aforementioned patent of R. W. Rees. For instance, it is known to form ionomers of acid copolymers using salts of sodium and zinc. The dyeability of blends of polyethylene and ionomer may be dependent to a significant extent on the metal ion in the ionomer. For instance, it is generally preferred to use ionomers containing zinc rather than ionomers containing sodium. Ionomers may also be formed from graft copolymers containing acid groups.

The blend comprises 65–99 parts by weight of the polyethylene and 1–35 parts by weight of the copolymer. In a preferred embodiment, the blend comprises 80–99 parts, but more preferred 80–97 parts, by weight of the polyethylene and 1–20, but more preferred 3–20 parts, by weight of the copolymer. Alternatively, in blends in which the copolymer is a graft copolymer, the blend preferably comprises 70–97 parts by weight of the polyethylene and 3–30 parts by weight of the acid copolymer. While high levels of graft copolymer could be used, the use of amounts of above 30 parts and especially above 35 parts by weight is believed to be economically unattractive.

In the process of the present invention, a polyolefin article is contacted with an aqueous dyebath. The polyolefin is as defined above. The article may be in any convenient shape or form and be obtained by extrusion, moulding or the like. In preferred embodiments, the article is in the form of film or a moulded article, techniques for the manufacture of which are known.

The dyebath is an aqueous dyebath which contains a basic dye. Although it is believed that any basic dye generally may be used in the process of the present invention, it is to be understood, as is illustrated hereinafter, that major differences exist between basic dyes in the ability of the dye to dye the polymers defined herein. For instance, it is illustrated herein that the hue and relative depth of dyeing obtained may differ significantly from the hue and relative depth of dyeing obtained with the same dye in the dyeing of, for instance, acrylic polymers. Such differences may be advantageous or disadvantageous, depending on the result that is being sought. The hue and relative depth of dyeing may also differ with the dyeing conditions used e.g. concentrations, pH and temperature. Examples of suitable dyes are illustrated.

The concentration of dye in the dyebath is at least 0.4 g/l and especially 2–5 g/l. However, the concentration that should be used will depend on the extent of dyeing of the article, the nature of the polymer blend and the particular dye selected. Such factors are illustrated hereinafter in the examples. The pH of the dyebath is at least 5.0, especially 5.0–7.5 and in particular 5.5–7.0, but the preferred pH may depend on the particular dye selected; the pH of the dyebath should be below the pH at which any precipitation and/or degradation of the basic dye may occur. As used herein, pH is measured at the temperature of the dyebath. The temperature of the dyebath should be at least 35° C., especially at least 55° C. and preferably at least 90° C.; the temperature must be kept below the temperature at which distortion or other deleterious physical property changes can occur in the polyolefin blend, as will be understood by those skilled in the art. A preferred temperature range is 95°–105° C. The dye must be selected so that it has adequate stability under the dyeing conditions; conversely, the temperature of the dye bath should be selected so that an acceptable rate of dyeing is achieved. It is understood that the dyebath is agitated. It is preferred that the dyebath does not contain so-called levellers or retarders, or a minimal amount thereof, which is contrary to practice in the dyeing of acrylic fibres. In the dyeing of polyethylene, levellers should be used only under the most favourable circumstances; small amounts of, for instance, sodium acetate arising from adjustment of pH of the dyebath with sodium hydroxide and acetic acid may be present in the dyebath.

In the process, the polyolefin article is maintained in the dyebath for at least 20 seconds. The period of the time will depend, however, on the particular dye selected, the nature of the polyolefin, the temperature of the dye bath and the depth of the dyeing that is to be achieved. The polyolefin article is then removed from the bath and washed or cleaned as appropriate.

The process of the present invention may be used in the dyeing of polyolefin film. In that event, it may be preferred that the dyed film be coloured but transparent. It may be preferred to only tint the film, rather than dye the film to an intense colour.

In a preferred embodiment a white pigment, especially titanium dioxide, is incorporated into the polyolefin; the white pigment is particularly preferred when the polyolefin article is a moulded article. The preferred amount of white pigment is 0.2-2% by weight.

The present invention is illustrated by the following examples. All parts, percentages and proportions are by weight unless otherwise indicated; dye weights are the actual weights used.

EXAMPLE I

A blend of 20% by weight of ionomer, 3% by weight of a 67% by weight concentrate of titanium dioxide in polyethylene and 77% by weight of Sclair® 8107 ethylene/butene-1 copolymer, which has a density of 0.924 g/cm$^3$ and a melt index of 5.1 dg/min, was moulded into plaques using an Engel* injection moulding apparatus. The ionomer was a copolymer of ethylene with 15% methacrylic acid, 23% neutralized with zinc, and with a melt index of 5.5 dg/min. The plaques were made using a melt temperature of 235° C. and were 0.25 cm thick, 14 cm in length and 10 cm in width.
*denote trade mark The plaques were dyed in an aqueous dyebath at a minimum temperature of 95° C. for one hour using a dye concentration of 0.52 g/l. The pH of the dyebath had been adjusted to 6.5 using sodium hydroxide and acetic acid.

When the dyestuff was Sandocryl® Brilliant Yellow B-6GL 200% obtained from Sandoz Canada Inc. of Dorval, Quebec, Canada, the plaque was dyed a very bright and attractive yellow (C.I. #1). When the dye was Sandocryl Blue B-3G 300%, the plaque was dyed an attractive light blue (C.I. #15); the colour shades used herein are described substantially according to "Permissible Hue Terms" of the "Hue Indication Chart" in the Colour Index, published by the Society of Dyers and Colourists, Bradford, U.K.

In related experiments, plaques moulded from compositions not containing titanium dioxide were also dyed. The presence of titanium dioxide markedly improved the attractiveness of the dyed plaques but both types of plaques were dyeable.

The plaques containing titanium dioxide were also dyed using dye concentrations of 3.6 g/l. The yellow dye gave a plaque that was deep yellow (C.I. #4–#5) in colour, whereas the blue dye gave a plaque that was dark blue (C.I. #14–#15) in colour. A red dye, Sandocryl Brilliant Red B-4G 200%, dyed the plaques red to yellowish-red (C.I. #8) colour. However, Sandocryl Brilliant Red B-RL 200% gave a red to reddish-brown (C.I. #8–#26) rather than a red coloured plaque.

EXAMPLE II

Using the procedure of Example I, plaques were prepared from a number of polymer compositions, as follows:

| Plaque No. | Base Polymer* | Additive Polymer Type and wt % | Titanium Dioxide** (wt %) |
|---|---|---|---|
| 1 | Sclair 8107 (powder) | Ionomer, 19% (powder) | 3 |
| 2 | Sclair 2907 (powder) | Ionomer, 20% (powder) | 3 |
| 3 | Sclair 2907 | Ionomer, 20% | 3 |

-continued

| Plaque No. | Base Polymer* (powder) | Additive Polymer Type and wt % (powder) | Titanium Dioxide** (wt %) |
|---|---|---|---|

*Sclair 8107 is an ethylene/butene-1 copolymer having a density of 0.924 g/cm$^3$ and a melt index of 5.1 dg/min. Sclair 2907 is a high density linear ethylene homopolymer having a melt index of 5.0 dg/min.
Ionomer was the ionomer of Example I.
**Titanium dioxide was 67% by weight concentrate in polyethylene.
Note: the powder passed through a 34 Tyler mesh screen.

Plaques No. 1–3 were dyed with Sandocryl Brilliant Yellow B-6GL 200% dye using the procedure of Example I, at a dye concentration of 3.6 g/l and a pH of 6.5. The plaques were dyed to a deep yellow colour (C.I. #3). Plaque No. 1 was slightly darker than Plaque No. 2, indicating that while the blend containing linear low density polyethylene (Plaque No. 1) is somewhat more susceptible to dyeing than that containing high density polyethylene, both are dyeable according to the present invention. Plaques No. 2 and 3 also indicate that powder or pellets may be used in forming the compositions of the invention.

Plaques No. 1 to 3 were also dyed using the following dyes at a concentration of 3.6 g/l, a pH of 6.5, a dyeing time of 60 minutes and a dyeing temperature of 95°–100° C.

A. Sandocryl Brilliant Blue B-BLE (which gave a blue (C.I. #14) colour);
B. Sandocryl Red B-BF 200% (which gave a bluish red (C.I. #9–#10) colour);
C. Sandocryl Blue B-RLE 300% (which gave a reddish grey to bluish grey (C.I. #45) colour);
D. Sandocryl Red B-BLE (which gave a yellowish pink (C.I. #48) colour);
E. Sandocryl Blue B-3G 300% (0.6 g/l)/Sandocryl Brilliant Yellow B-6GL (3.0 g/l) (which gave a yellowish-green to olive (C.I. #19) colour).

Two dye baths containing mixed dye systems were used, at different concentrations:

F. Sandocryl Brilliant Blue B-BLE (0.72 g/l)/Sandocryl Brilliant Yellow B-6GL 200% (0.72 g/l);
G. Sandocryl Brilliant Red B-F 200% (0.72 g/l)/Sandocryl Brilliant Yellow B-6GL 200% (2.9 g/l).

The results obtained were as follows, in order of depth of dyeing (the scale used is 1=deeply dyed and 10=not dyed; the dyeing of the plaques was rated visually):

| Plaque No. | DYE | | | | | | |
| | A | B | C | D | E | F | G |
|---|---|---|---|---|---|---|---|
| 1 | 2 | 1 | 2 | 1 | 1 | 2 | 1 |
| 2 | 3 | 2 | 3 | 2 | 2 | 3 | 2 |
| 3 | 3 | 2 | 3 | 2 | 2 | 3 | 2 |

Dye D dyed to a paler shade than the other dyes. With Dye F, Plaque No. 1 was dyed greenish navy to greenish blue (C.I. #39) whereas Plaques No. 2 and 3 were dyed bluish green to greenish blue (C.I. #16, dark). With Dye G, Plaques No. 1 to 3 were dyed reddish yellow to yellowish orange (C.I. #4) colour.

This example shows the dyeing of plaques according to the present invention.

EXAMPLE III

Plaques were injection moulded using the procedure of Example I from a number of compositions. In each composition, the polyethylene was Sclair 2907 polyethylene, the ionomer was the ionomer of Example I and the titanium dioxide was 67% by weight concentrate of titanium dioxide in polyethylene.

Plaques were dyed using Dye G of Example II in a four day-old dye bath, that had been maintained at ambient temperature, and with Sandocryl Brilliant Yellow B-6GL 200% at a concentration of 3.6 g/l using the procedure of Example I, using a dyeing time of 30 minutes.

The results obtained were as follows, in the order of depth of dyeing, Runs 4 and 5 being comparative runs:

| Plaque | Composition (wt %) | | | Dyeability | |
|---|---|---|---|---|---|
| No. | Polyethylene | Ionomer | TiO$_2$ | Dye G | Yellow Dye |
| 4 | 97 | 0 | 3 | 5 | 9 |
| 5 | 85 | 0 | 15 | 5 | 9 |
| 6 | 82 | 15 | 3 | 2 | 1 |
| 7 | 87 | 10 | 3 | 3 | 2 |
| 8 | 92 | 5 | 3 | 3 | 3 |
| 9 | 94.5 | 2.5 | 3 | 4 | 4 |
| 10 | 94 | 5 | 1 | 1 | 1 |

With Dye G, Plaques No. 4 and 5 were dyed very faintly pink (C.I. #49) and Plaques No. 6 to 10 were dyed reddish-orange to yellowish red (C.I. #7) colour. With the yellow dye, Plaques 4 and 5 were dyed very faintly yellow and the remaining plaques were dyed greenish-yellow (C.I. #1-#2).

This example shows that decreasing the ionomer content reduces the dye depth obtained, and that titanium dioxide does not confer dyeability on polyethylene in the absence of the ionomer.

EXAMPLE IV

The procedure of Example III was repeated using a composition of 77% by weight of Sclair 2907 polyethylene, 3% of the titanium dioxide concentrate and 20% of an ionomer or ethylene/methacrylic acid copolymer. The dyes used were those of Example III plus Sandocryl Brilliant Red B-F 200% (3.6 g/l); the dyeing time was 60 minutes.

The results obtained, in the order of decreasing dye depth (1=darkest), were:

| Plaque No. | Polymer* Polymer | Dye G** | Dyeability Yellow Dye** | Red Dye** |
|---|---|---|---|---|
| 11 | 8020 | 5 | 5 | 6 |
| 12 | 8527 | — | 7 | 7 |
| 13 | 8550 | 6 | 6 | 7 |
| 14 | 8940 | — | 4 | 5 |
| 15 | 9450 | 3 | 3 | 3 |
| 16 | 9650 | 2 | 2 | 2 |
| 17 | 9721 | 1 | 1 | 1 |
| 18 | 910 | 4 | 4 | 4 |

*The code given for polymer is the trade designation of the Surlyn ionomer resin used, except Plaque No. 18 where the polymer was a Nucrel ethylene/methacrylic acid copolymer.
**For Dye G, the paler shades approximated yellowish-pink (C.I. #48) and the deepest shades approximated reddish-orange to yellowish red (C.I. #7).
For the yellow dye, the hue was greenish yellow (C.I. #1-#2).
For the red dye, the paler shades approximated pink (C.I. #50) and the deeper shades red (C.I. #8-#9).

The ionomers containing zinc viz. the 9000 series of Surlyn ionomers, gave deeper dye colours than the ionomers containing sodium viz. the 8000 series of Surlyn ionomers. The ethylene/methacrylic acid copolymer showed intermediate dyeing performance.

EXAMPLE V

Plaque No. 17 of Example IV was tested for the relationship between dye depth and the time of dyeing using Sandocryl Brilliant Yellow B-6GL 200% using a dye concentration of 3.6 g/l, a temperature of 95°–100° C. and a pH of 6.5. There was significant dyeing after only 20 seconds (a yellow hue (C.I. #1) immersion in the dyebath which increased with time to yield a brilliant reddish yellow to yellowish orange (C.I. #4) colour after sixty minutes. Similar results were obtained with Plaques similar to Plaque No. 17 but moulded from compositions containing Surlyn 9950 instead of Surlyn 9721 ionomer.

EXAMPLE VI

Film pressed from an injection moulded plaque of a blend of 20% of an ionomer essentially similar to the ionomer of Example I and 80% of SCLAIR 8405 polyethylene (an ethylene/butene-1 copolymer of density 0.937 g/cm$^3$ and a melt index of 2.7 dg/min) were dyed with a number of dyes. The dyes were in a dyebath of the type described in Example I at a concentration of 0.75 g/l and a pH of 6.5. Dyeing time was 60 minutes at 98° C.

The dyes were:
(i) Maxilon* Blue GRL 300% (Ciba-Geigy Co.) (which gave a brownish colour (C.I. #31));
(ii) Sandocryl* Brilliant Yellow B6GL 200% (Sandoz) (which gave a yellowish colour (C.I. #1));
(iii) Sandocryl Brilliant Red B-4G 200% (Sandoz) (which gave a yellow orange to orange colour (C.I. #5));
(iv) Sandocryl Blue B-3G 300% (Sandoz) (which gave a blue colour (C.I. #15, pale)).
*denotes trade mark Attractive medium-dyed transparent films were produced. Similar hues but in a deeper shade were obtained when a dye concentration of 3.6 g/l was used. In contrast, films made from the unmodified polyethylene were dyed to an insignificant extent.

EXAMPLE VII

The procedure of Example IV was repeated by blending a number of different polymers with Sclair 2907 polyethylene and 3% by weight of the 67% by weight titanium dioxide concentrate.

The plaques obtained were dyed with the Sandocryl Brilliant Yellow B-6GL 200% dye. The dye depth was estimated visually on a scale of 1 (deeply dyed) to 10 (not dyed). In addition, the colour of the dyed plaques was measured using a Hunter* L,a,b colorimeter.
*denotes trade mark Further details and the results obtained are as follows, dye depth being the relative order of depth of dyeing:

| Plaque No. | Polymer** | Dye Depth | Colour Measurement | | |
|---|---|---|---|---|---|
| | | | L | a | b |
| A. 20% by weight of Polymer | | | | | |
| 19 | A | 4 | 91.8 | −20.7 | 50.1 |
| 20 | B | 3 | 91.7 | −20.3 | 48.3 |
| 21 | C | 2 | 90.9 | −20.5 | 54.2 |
| 22 | D | 3 | 91.1 | −21.1 | 52.5 |
| 23 | E | 6 | 91.1 | −17.4 | 42.2 |
| 24 | F | 1 | 88.4 | −18.5 | 57.4 |
| 25 | Elvax ® 350 | 8 | 91.0 | −8.8 | 25.0 |
| 26 | Soarnol ® D | 5 | 91.9 | −19.6 | 45.3 |
| B. 2.5% by weight by Polymer | | | | | |

| Plaque No. | Polymer** | Dye Depth | Colour Measurement | | |
|---|---|---|---|---|---|
| | | | L | a | b |
| 27 | A | 7 | 92.8 | −16.3 | 38.2 |
| 28 | B | 6 | 92.1 | −17.9 | 40.8 |
| 29 | C | 4 | 91.3 | −20.0 | 47.6 |
| 30 | D | 6 | 92.0 | −18.5 | 42.3 |
| 31 | E | 9 | 91.5 | −9.3 | 23.1 |
| 32 | F | 3 | 90.5 | −19.6 | 46.6 |

**A . . . copolymer of ethylene with 9% methacrylic acid, melt index 10 dg/min.
B . . . copolymer of ethylene with 9% methacrylic acid, melt index 3 dg/min.
C . . . copolymer of ethylene with 15% methacrylic acid, melt index 25 dg/min.
D . . . copolymer of ethylene with 10% methacrylic acid and 10% isobutyl acrylate, melt index 35 dg/min.
E . . . ionomer, copolymer of ethylene with 15% methacrylic acid, 59% neutralized with sodium, melt index 0.9 dg/min.
F . . . ionomer, copolymer of ethylene with 12% methacrylic acid, 38% neutralized with zinc, melt index 1.6 dg/min.
Elvax ® 350 is an ethylene/vinyl acetate copolymer
Soarnol ® D is an ethylene/vinyl alcohol copolymer.

Dyed plaques rated 8 or 9 in the order of depth of dyeing were not dyed to a deep shade. Plaque No. 25 is not of the invention.

At the 20% level of addition of polymer, all of the ethylene/methacrylic acid plaques were dyeable; the plaque of Run 29 was also dyeable. The zinc-containing monomer was deeply dyeable at both levels of addition whereas the sodium containing ionomer was not. The plaque containing the ethylene/vinyl alcohol copolymer was dyeable to a greater extent that the plaque containing ethylene/vinyl acetate copolymer.

EXAMPLE VIII

To illustrate possible differences between the dyeing of the blends of the present invention and the dyeing of acrylic fibres, samples of a blend of the ionomer of Example I (20%, by weight), ethylene/butene-1 co-polymer (77% by weight) and titanium dioxide (3% of a 67% $TiO_2$ masterbatch, by weight) were dyed with a variety of dyestuffs. The dye concentration was 1.8 or 3.6 g/l. The pH of the dyebath was 6.5 and the temperature was 95°–100° C. Dyeing time was 60 minutes.

Data for acrylic fibre was obtained from the aforementioned Sandoz manual. The dyeing method is described at page 45; the acrylic fibre to be dyed was placed in a dye bath at 60° C. and the temperature of the dyebath was then raised at a rate of 1° C./minute. The data reported for acrylic fibre in Table I is data for a dyeing time of 30 minutes, when the temperature was 90° C.

The results obtained are reported in Table I.

EXAMPLE IX

To show the effect of pH of the dyebath, plaques of the polymer blend of Example I were dyed for one hour at 95°–100° C. using a dye concentration of 3.6 g/l. Dyebaths having pH of 4.5, 5.5, 6.5 and 7.5 were used.

Three different dyes were tested viz. Sandocryl Brilliant Yellow B-6GL 200%, Sandocryl Brilliant Red B-F 200% and Sandocryl Blue B-BLE.

The dyed plaques were reviewed to determine (a) the dyebath pH that gave the best dye depth and (b) the dyebath pH that gave the best colour stability, as determined from samples that had been exposed to light for several days.

| Dye Type | Dye Depth Optimum pH | Colour Stability Optimum pH |
|---|---|---|
| Yellow B-6GL | 5.5–7.5 | 5.5–7.5 |
| Red B-F | 6.5, 7.5 | 6.5, 7.5* |
| Blue B-BLE | 5.5, 6.5 | 5.5, 6.5 |

*sample dyed at pH 4.5 was completely bleached after 14 days.

EXAMPLE X

To determine the effect of temperature on the dyeing process of the present invention, 1.8 g of Sandocryl Brilliant Yellow B-6GL 200% dye was admixed with 500 ml of purified water and heated to a pre-determined temperature. The pH of the resultant solution was then adjusted to 6.5 by addition of a 10% by weight aqueous solution of sodium hydroxide.

A blend of 78% by weight of Sclair 2907 ethylene homopolymer, 20% by weight of an ionomer viz. a copolymer of ethylene with 15% by weight of methacrylic acid, 23% neutralized with zinc and having a melt index of 5.5 dg/min, and 2% by weight of titanium dioxide was injection moulded into plaques having a thickness of 2.5 mm. A plaque was then placed in the dye solution for a period of sixty minutes, removed and washed with purified water and dried.

The colour of the dyed plaque was then visually rated using a scale of from 0 (no dyeing) to 10 (deepest colour for the sample).

Further details and the results obtained were as follows:

| Run No. | Temperature (°C.) | Dye Colour (Scale 0–10) |
|---|---|---|
| 1 | 95–99 | 10 |
| 2 | 85 | 10 |

TABLE I

| Dyestuff* | Plaque Usefully Dyed** | | Hue | |
|---|---|---|---|---|
| | 1.8 g/l | 3.6 g/l | Acrylic Polymer*** | Polyethylene (3.6 g/l) |
| Red B-BLE | No | Yes | — | Yellowish pink (C.I. #48) |
| Brilliant Red B-F 200% | Yes | Yes | Deep ("shocking") Pink | Bluish red (C.I. #9 & #10) |
| Red B-RL 200% | No | Yes | Deep Rose | Red to reddish brown (C.I. #8–#26) |
| Red B-4G 200% | — | Yes | — | Red to yellowish red (C.I. #8) |
| Blue B-RLE 300% | — | Yes | Very Brilliant Blue | Blue to reddish blue (C.I. #14) |

*Sandocryl ® dyestuffs.
**Good depth of colour, not streaky or unattractive.
***From colour of samples of dyed acrylic fibre in Sandoz manual.

-continued

| Run No. | Temperature (°C.) | Dye Colour (Scale 0-10) |
|---|---|---|
| 3 | 75 | 10 |
| 4 | 65 | 10 |
| 5 | 55 | 10 |
| 6 | 46 | 10 |
| 7 | 35 | 7 |
| 8 | 22 | 1 |

This example shows that acceptable dyeing of the plaque was obtained at temperatures of about 35° C. or above.

EXAMPLE XI

The procedure of Example X was repeated using Sandocryl Brilliant Blue B-BLE dye instead of the yellow dye.

Further details and the results obtained were as follows:

| Run No. | Temperature (°C.) | Dye Colour (Scale 0-10) |
|---|---|---|
| 9 | 85 | 10 |
| 10 | 75 | 9 |
| 11 | 65 | 5 |
| 12 | 55 | 4 |
| 13 | 25 | 0 |

This example shows that acceptable dyeing of the plaque was less readily attainable with this blue dye than with the yellow dye of Example X.

EXAMPLE XII

The procedure of Example X was repeated using filaments formed from a blend of Sclair 11K polyethylene (87% by weight), Sclair 11K melt-grafted with maleic anhydride (19.9% by weight) and titanium dioxide (2.1%, of a 67% by weight masterbatch in polyethylene). Sclair 11K is an ethylene/butene-1 copolymer having a density of 0.920 g/cm$^3$ and a melt index of 1.4 dg/min. The grafted polymer had a density of 0.920 g/cm$^3$ and a melt index of 0.94 dg/min, and contained 0.67% by weight of maleic anhydride.

The dyeing test was carried out at 95°-99° C. and at 22° C. The filament dyed at 95°-99° C. was dyed a deep brilliant yellow. In comparison, the sample dyed at 22° C. was only dyed to level 2 on the visual rating scale.

EXAMPLE XIII

Polyethylene and/or ionomer, in powder form having a particle size of about 34 mesh, were fed to a cylindrical mould and subjected to a rotational moulding process. The mould was placed in an oven maintained at 343° C. for a period of eleven minutes, air cooled for one minute and then sprayed with water (27° C.) for five minutes.

The monomer was that described in Example I. The polyethylene was Sclair 2909 ethylene homopolymer, a high density linear polymer having a melt index of 13.5 dg/min.

Pieces were cut from the rotational moulded cylinder that was obtained and dyed in dyebaths containing either Sandocryl Brilliant Yellow B6GL 200% or Sandocryl Brilliant Blue B-BLE. The pH of the dyebaths was 6.5, the dyebath temperature was 95°-100° C. and the dyeing time was 60 minutes.

Details of the powder compositions subjected to the rotational moulding process were as follows:

| Run No. | Polyethylene (wt. %) | Ionomer (wt. %) |
|---|---|---|
| 14 | 100 | 0 |
| 15 | 95 | 5 |
| 16 | 90 | 10 |

The sections of Run 14 were not dyed. The sections of Runs 15 and 16 were dyed, the latter being deeply dyed. It was noted that the dye depth was greater on the surface that had been the inner surface of the cylinder.

EXAMPLE XIV

A blend of pellets of Sclair 11K ethylene/butene-1 copolymer (93% by weight, copolymer is described in Example XII) and ionomer (7% by weight, ionomer was copolymer of ethylene and 12% methacrylic acid, 46% neutralized with zinc and with a melt index of 1.0 dg/min) was fed to apparatus for the manufacture of blown film. Films having thicknesses of from about 9 to about 200 microns were manufactured.

Samples of the films obtained were dyed with Sandocryl Brilliant Yellow B6Gl 200%, Sandocryl Brilliant Blue B-BLE and Sandocryl Brilliant Red B-F 200% dyes. Dye concentrations of 3.6 g/l were used. The pH of the dyebaths was 6.5, the dyebath temperature was 95°-100° C. and the dyeing time was one hour.

All samples were deeply dyed.

We claim:

1. A process for dyeing a polyolefin article, comprising the steps of:
   (A) contacting the polyolefin article with an aqueous dyebath, said aqueous dyebath having a pH of 5.0-7.5, a temperature of at least 35° C. and containing basic dye in a concentration of at least 0.4 g/l, said polyolefin being a blend comprising (i) 65-99 parts by weight of a polyethylene selected from the group consisting of homopolymers of ethylene and copolymers of ethylene with $C_3$-$C_{10}$ higher alpha-olefins, and mixtures thereof, and (ii) 1-35 parts by weight of a copolymer selected from the group consisting of direct copolymers and graft copolymers wherein (a) said direct copolymer is a copolymer of ethylene with at least one alpha,beta-ethylenically unsaturated monocarboxylic acid having from 3 to 8 carbon atoms, the acid moieties being randomly or non-randomly distributed in the polymer chain, the carboxylic acid content being 0.5-50% by weight of the direct copolymer, (b) said graft copolymer is obtained by grafting 0.1 to 20 percent by weight of at least one alpha,beta-unsaturated carboxylic acid having 3 to 8 carbon atoms or unsaturated carboxylic acid anhydride onto a preformed polyolefin backbone derived from ethylene or ethylene and $C_3$ to $C_8$ alpha-olefin, and (c) said copolymer is a copolymer of (a) or (b) in the form of a zinc ionomer,
   (B) maintaining said polyolefin article in contact with the aqueous dyebath for a period of at least 20 seconds, and
   (C) removing the polyolefin article so dyed from the aqueous dyebath.

2. The process of claim 1 in which the temperature of the dyebath is at least 55° C.

3. The process of claim 2 in which the blend is comprised of 80-99 parts by weight of the polyethylene and 1-20 parts by weight of the copolymer.

4. The process of claim 3 in which the pH of the dyebath is in the range of 5.5-7.0.

5. The process of claim 3 in which the blend contains 0.2-2.0% of a white pigment.

6. The process of claim 5 in which the white pigment is titanium dioxide.

7. The process of claim 3 in which the copolymer is a direct copolymer of (a).

8. The process of claim 3 in which the copolymer is a graft copolymer of (b).

9. The process of claim 3 in which the copolymer is a direct copolymer of (c).

10. The process of claim 3 in which the concentration of the dyestuff is 2-5 g/l.

11. The process of claim 1 in which the temperature of the dyebath is at least 90° C.

12. The process of claim 11 in which the blend is comprised of 80-97 parts by weight of the polyethylene and 3-20 parts by weight of the copolymer.

13. The process of claim 4 in which the polyethylene is selected from the group consisting of homopolymers of ethylene and copolymers of ethylene and $C_4$-$C_{10}$ higher alpha-olefins.

14. The process of claim 13 in which the blend is comprised of 80-99 parts by weight of the polyethylene and 1-20 parts by weight of the copolymer.

* * * * *

UNITED STATES PATENT AND TRADEMARK OFFICE
CERTIFICATE OF CORRECTION

PATENT NO. : 4,732,571

DATED : March 22, 1988

INVENTOR(S) : John R. B. Boocock and Vaclav G. Zboril

It is certified that error appears in the above-identified patent and that said Letters Patent is hereby corrected as shown below:

Column 13, lines 14 and 15, "a direct copolymer" should read -- an ionomer --.

Signed and Sealed this

Twenty-second Day of November, 1988

Attest:

DONALD J. QUIGG

*Attesting Officer*  *Commissioner of Patents and Trademarks*